US011397878B2

(12) United States Patent
Morovic et al.

(10) Patent No.: US 11,397,878 B2
(45) Date of Patent: *Jul. 26, 2022

(54) PRINTER CALIBRATION

(71) Applicant: Hewlett-Packard Development Company, L.P., Spring, TX (US)

(72) Inventors: Peter Morovic, Sant Cugat del Valles (ES); Jan Morovic, London (GB); Pere Gasparin Talarn, Sant Cugat del Valles (ES); Victor Diego Gutierrez, Sant Cugat del Valles (ES); Javier Maestro Garcia, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/976,876

(22) PCT Filed: Mar. 8, 2018

(86) PCT No.: PCT/US2018/021621
§ 371 (c)(1),
(2) Date: Aug. 31, 2020

(87) PCT Pub. No.: WO2019/172919
PCT Pub. Date: Sep. 12, 2019

(65) Prior Publication Data
US 2021/0004654 A1    Jan. 7, 2021

(51) Int. Cl.
*G06K 15/02*    (2006.01)
*G06K 15/00*    (2006.01)

(52) U.S. Cl.
CPC ......... *G06K 15/027* (2013.01); *G06K 15/188* (2013.01); *G06K 15/407* (2013.01)

(58) Field of Classification Search
CPC ... G06K 15/027; G06K 15/188; G06K 15/407
USPC ...... 358/3.06, 3.03, 3.13, 3.1, 3.3, 1.9, 1.15, 358/534, 536
See application file for complete search history.

(56) References Cited

U.S. PATENT DOCUMENTS

| 6,178,007 B1 | 1/2001 | Harrington |
| 6,377,366 B1 | 4/2002 | Usami |
| 7,491,424 B2 | 2/2009 | Hersch et al. |
| 7,898,690 B2 | 3/2011 | Matsuzawa |

(Continued)

*Primary Examiner* — Quang N Vo
(74) *Attorney, Agent, or Firm* — HP Inc. Patent Department

(57) ABSTRACT

Certain examples described herein relate to printer calibration. In some cases, adjustment data is received, indicating an adjustment to be applied to a given colorant. A Neugebauer Primary area coverage (NPac) vector defining an operating set of Neugebauer Primaries (NPs) is obtained. Configuration data is determined, dependent on the operating set of NPs. The configuration data maps colorant adjustments to relationships between NPs in the operating set, for both an increase and a decrease in the given colorant. In some cases, the configuration data and the adjustment parameters are used to identify first and second subsets of the operating set of NPs. The NPac vector is adjusted by decreasing an area coverage of an NP in the first subset and complementarily increasing an area coverage of an NP in the second subset.

15 Claims, 5 Drawing Sheets

(56) References Cited

U.S. PATENT DOCUMENTS

| | | |
|---|---|---|
| 8,132,887 B2 | 3/2012 | Friedman et al. |
| 8,848,257 B2 | 9/2014 | Ukishima |
| 9,497,356 B1 | 11/2016 | Pjanic et al. |
| 2007/0086026 A1 | 4/2007 | Huan |
| 2010/0134550 A1 | 6/2010 | Ito et al. |
| 2010/0214576 A1 | 8/2010 | Morovic |
| 2011/0096345 A1 | 4/2011 | Benedicto |
| 2012/0105878 A1 | 5/2012 | Aharon |
| 2013/0021631 A1 | 1/2013 | Nachlieli |
| 2016/0086059 A1* | 3/2016 | Morovic ................. B41J 29/38 347/19 |
| 2019/0238723 A1* | 8/2019 | Morovic ................. H04N 1/60 |

* cited by examiner

PRINTER CALIBRATION

BACKGROUND

A printing system may include different printing fluids or colorants. By overprinting images for each of the printing fluids or colorants, an image with a range of different colors can be printed. An example printing pipeline may be calibrated so that printed colors are similar to or match desired colors, such as those defined in a digital format.

BRIEF DESCRIPTION OF THE DRAWINGS

Various features of the present disclosure will be apparent from the detailed description which follows, taken in conjunction with the accompanying drawings, which together illustrate, by way of example, features of the present disclosure, and wherein.

DETAILED DESCRIPTION

Figure 1:
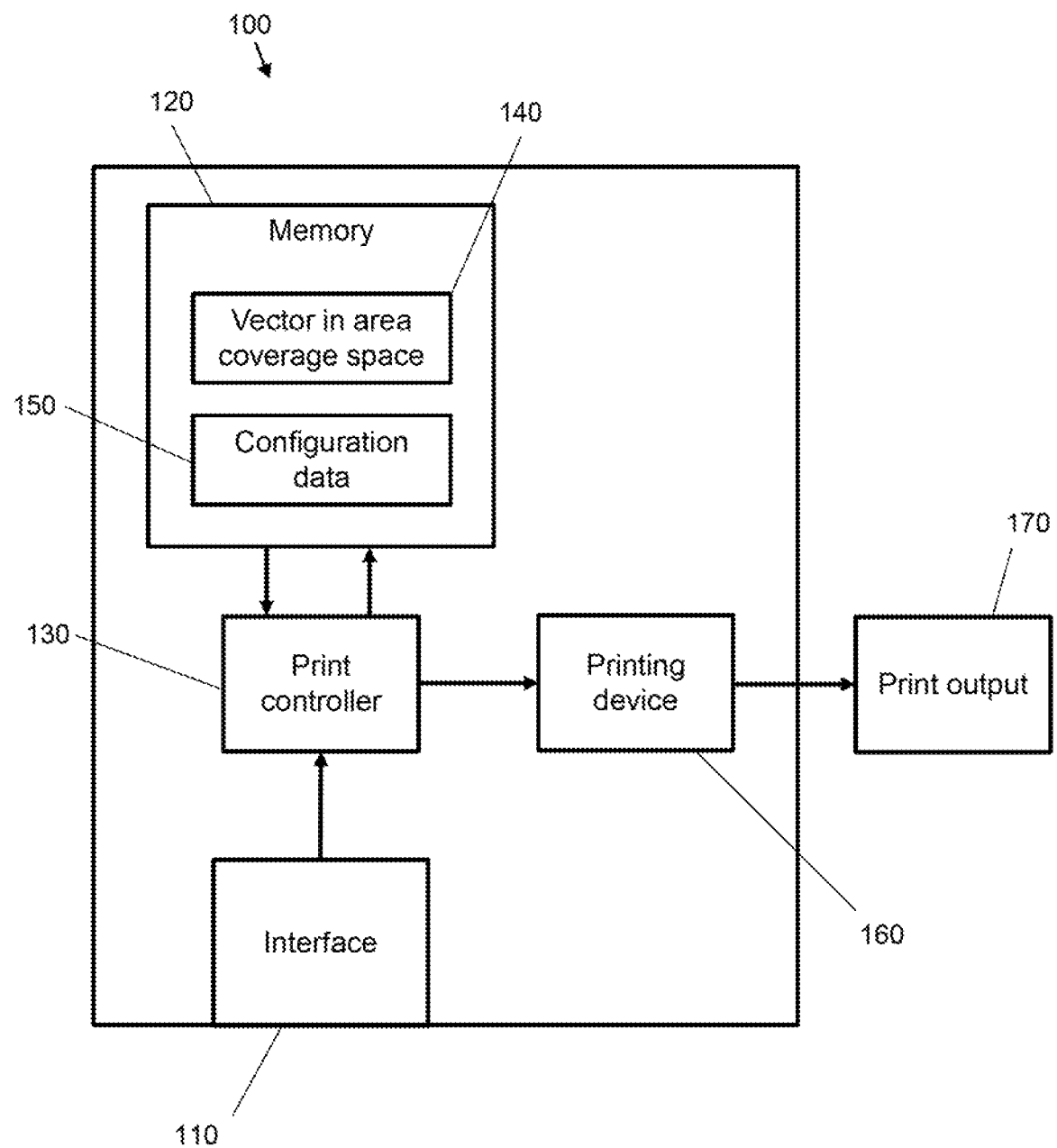
FIG. 1 is a schematic diagram of a printing system according to an example.

Certain examples described herein relate to color calibration of a printing system. Color calibration of a printing system may, for example, be used to adjust the color response of the printing system to more accurately correspond to a desired color to be printed. Color calibration may be used to calibrate a color mapping process by which a first representation of a given color is mapped to a second representation of the same color.

Color can be represented within print and display devices in a variety of ways. For example, in one case, a color as observed visually by an observer is defined with reference to a power or intensity spectrum of electromagnetic radiation across a range of visible wavelengths. In other cases, a color model is used to represent a color at a lower dimensionality. For example, certain color models make use of the fact that color may be seen as a subjective phenomenon, i.e. dependent on the make-up of the human eye and brain. In this case, a "color" may be defined as a category that is used to denote similar visual perceptions; two colors are said to be similar if they produce a similar effect on a group of one or more people. These categories can then be modelled using a lower number of variables.

Within this context, a color model may define a color space. A color space in this sense may be defined as a multi-dimensional space, with a point in the multi-dimensional space representing a color value and dimensions of the space representing variables within the color model. For example, in a Red, Green, Blue (RGB) color space, an additive color model defines three variables representing different quantities of red, green and blue light. In a digital model, values for these quantities may be defined with reference to a quantized set of values. For example, a color defined using an 8-bit RGB model may have three values stored in a memory, wherein each variable may be assigned a value between 0 and 255. Other color spaces include: a Cyan, Magenta, Yellow and Black (CMYK) color space, in which four variables are used in a subtractive color model to represent different quantities of colorant or printing fluid, e.g. for a printing system; the International Commission on Illumination (CIE) 1931 XYZ color space, in which three variables ('X', 'Y' and 'Z' or tristimulus values) are used to model a color; the CIE 1976 (L*, a*, b*—CIELAB or 'LAB') color space, in which three variables represent lightness ('L') and opposing color dimensions ('a' and 'b'); and the Yu'v' color space, in which three variables represent the luminance ('Y') and two chrominance dimensions (u' and v').

Other color spaces include area coverage spaces, such as the Neugebauer Primary area coverage (NPac) color space. An NPac vector in the NPac color space represents a statistical distribution of Neugebauer Primaries (NPs) over an area of a halftone. In a simple binary (bi-level, i.e. two drop states: "drop" or "no drop") printer, an NP may be one of $2^k-1$ combinations of k printing fluids within the printing system, or an absence of printing fluid (resulting in $2^k$ NPs in total). An NP may thus be seen as a possible output state for a print-resolution area. The set of NPs may depend on an operating configuration of a device, such as a set of available colorants. A colorant or printing fluid combination as described herein may be formed of one or multiple colorants or printing fluids. For example, if a bi-level printing device uses CMY printing fluids there can be eight NPs or output states. These NPs relate to the following: C, M, Y, CM, CY, MY, CMY, and W (white or blank indicating an absence of printing fluid). An NP may comprise an overprint of two available printing fluids, such as a drop of magenta on a drop of cyan (for a bi-level printer) in a common addressable print area (e.g. a printable "pixel"). An NP may be referred to as a "pixel state".

In multi-level printers, e.g. where print heads are able to deposit N drop levels, an NP may include one of $N^k-1$ combinations of k printing fluids, or an absence of printing fluid (resulting in $N^k$ NPs in total). A multi-level printer may use a piezo-electric or thermal print head that is capable of depositing different numbers of drops or different drop volumes, and/or may use multiple passes of a print head, to enact different drop states. For example, if a multi-level printer uses CMY printing fluids with four different drop states ("no drop", "one drop", "two drops" or "three drops"), available NPs can include C, CM, CMM, CMMM, etc. A "drop sequence" as used herein may define a set of drop states used or useable by a given printing system in a given operating state.

Each NPac vector may therefore define a probability distribution for colorant or printing fluid combinations for each pixel in the halftone (e.g. a likelihood that a particular colorant or printing fluid combination or available output state is to be placed or defined at each pixel location in the halftone). In this manner, a given NPac vector defines a set of halftone parameters that can be used in the halftoning process to map a color to NPac vectors to be statistically distributed over the plurality of pixels for a halftone. Moreover, the statistical distribution of NPs to pixels in the halftone serves to control the colorimetry and other print characteristics of the halftone.

Spatial distribution of NPs according to the probability distribution specified in the NPac vector may be performed using a halftone method. Examples of suitable halftoning methods include matrix-selector-based Parallel Random Area Weighted Area Coverage Selection (PARAWACS) techniques and techniques based on error diffusion. This may result in discrete deposit instructions for print resolution pixels, e.g. instructing 0 to N drops of each of the k printing fluids on an addressable area of a print medium. Over a plurality of addressable areas, e.g. an area of print substrate, having a color defined by an NPac vector, the distribution of the printed output will tend towards the statistical distribution of area coverage defined by the NPac vector. An example of a printing system that uses area coverage representations for halftone generation is a Halftone Area Neugebauer Separation (HANS) pipeline.

Color calibration of a printing system may be performed on independent colorant channels separately, that is, by performing one-dimensional correction on a colorant-by-colorant basis. While this method may produce an accurate calibration of the colorant channels themselves, it may not take color interaction into account. For example, colors for which colorants or printing fluids are overprinted or combined may not be calibrated accurately. Calibration of colorant combinations may be uncontrolled when correction is performed on a colorant-by-colorant basis. Furthermore, some printing systems may be configured not to have independent colorant channels. In a HANS printing system, for example, area coverages in an NPac vector may sum to 1, since the area coverages represent probabilities. There is therefore a dependency between different colorant combinations, where if the area coverage of one colorant combination is increased, the area coverage of other colorant combinations contributing to the NPac vector is decreased.

As an alternative to performing calibration on a colorant-by-colorant basis, color calibration may be performed on an NP-by-NP basis, where each NP corresponds to a colorant combination. Each NP in a set of available NPs may be printed, color measured and individually adjusted. However, printing systems may use a relatively large number of NPs. For example, there may be 128 available NPs. A set of available NPs may be referred to as an "operating set" of NPs. An operating set of NPs is a set of NPs that is implementable by a printing system in a given configuration or operating state. In some examples, there are more than 128 available NPs. Printing and color measuring each NP may be inefficient and/or impractical in terms of print target wastage, e.g. media wastage, and/or calibration time, especially since multiple patches may be printed and color measured for each NP to obtain a correction factor for that NP. Further, applying corrections to different NPs independently may not be applicable in some systems.

One method of performing calibration in a HANS printing system involves reducing an amount of colorant in an NPac vector to a target level, e.g. based on measured calibration data, and increasing an amount of whitespace in the NPac vector to compensate for the reduced amount of colorant. However, this method can increase grain and thus affect the visual quality of the print output. Further, this method may not be used for increasing an amount of colorant.

Color calibration in a HANS printing system may be implemented using numerical optimization, e.g. linear programming techniques. However, such techniques may be computationally expensive and/or time-consuming.

FIG. 1 shows a printing system 100 according to an example. Certain examples described herein may be implemented within the context of this printing system.

The printing system 100 may be a 2D printing system such as an inkjet or digital offset printer, or a 3D printing system, otherwise known as an additive manufacturing system. In the example of FIG. 1, the printing system 100 comprises an interface 110, a memory 120 and a print controller 130. The print controller 130 may be implemented using machine readable instructions executed by a processing device and/or suitably programmed or configured hardware.

In this example, the printing system 100 comprises a printing device 160. The printing device 160 is arranged to print a calibration area onto a print substrate to produce a print output 170. The print output 170 may, for example, comprise colored printing fluids deposited on a substrate. The printing device 160 may comprise an inkjet deposit mechanism, which may for example comprise a nozzle to deposit printing fluid on the substrate. The inkjet deposit mechanism may include circuitry to receive instructions associated with depositing printing fluid. In 2D printing systems, the substrate may be paper, fabric, plastic or any other suitable print medium.

In 3D printing systems, the print output 170 may be a 3D printed object. In such systems, the substrate may be a build material in the form of a powder bed comprising, for example, plastic, metallic, or ceramic particles. Chemical agents, referred to herein as "printing agents", may be selectively deposited onto a layer of build material. In one case, the printing agents may comprise a fusing agent and a detailing agent. The fusing agent and detailing agent may control a temperature of a bed of build material. The fusing agent may comprise an energy-absorbing chemical compound that acts to increase a temperature of a portion of build material. The detailing agent may comprise a cooling agent, such as a water-based liquid, that acts to reduce a temperature of a portion of build material. In this manner, a fusing agent may be selectively applied to a layer in areas where particles of the build material are to fuse together, and a detailing agent may be selectively applied where the fusing action is to be reduced. In some examples, the printing agents may comprise colorants and may be deposited on a white or blank powder to color the powder. In other examples, objects may be constructed from layers of fused colored powder.

The printed calibration area may be otherwise referred to as a "test patch" or "test area", The printed calibration area may be used to calibrate the printing system 100. The printed calibration area corresponds to a given colorant in a set of colorants printable by the printing system 100. A colorant may be otherwise referred to as a "printing fluid". A colorant may correspond to a given base color, where other colors may be formed from combinations of colorants. Examples of base colors include, but are not limited to, cyan, magenta, yellow, red, green and blue and black. In some examples, a plurality of calibration areas is printed, each corresponding to a different colorant in the set of colorants. In one example, the set of colorants comprises four colorants. In another example, the set of colorants comprises seven colorants. In another example, the set of colorants comprises fifteen colorants. The number of colorants in the set of colorants may be less than the number of possible colorant combinations, e.g. NPs, based on the given set of colorants. A plurality of patches may be printed for a given colorant. In some examples, sixteen patches are printed for a given colorant in the set of colorants. Different patches may correspond to different amounts of the given colorant.

In some examples, the printing system 100 comprises a measurement device (not shown). The measurement device is arranged to obtain a measurement of an optical property of the printed calibration area corresponding to the given colorant. An example optical property to be measured is a reflectance spectrum. The measurement device may be an optical measurement device. The optical measurement device may comprise a color measurement device.

Examples of optical measurement devices include, but are not limited to, photodiodes, spectrophotometers, spectrofluorometers, spectrocolorimeters, tristimulus colorimeters, densitometers and lightness sensors. In some examples, the measurement device is separate from the printing system 100. The measurement device may be communicatively coupled to the printing system 100, for example via the interface 110.

The interface 110 is arranged to receive data indicating an adjustment to be applied to a given colorant in a set of colorants printable by the printing system 100. In an example, the interface 110 comprises a measurement interface. The data indicating the adjustment may comprise an indication of a measured optical property of a printed calibration area. Such an optical property may be measured by a measurement device, for example. The data indicating the adjustment to be applied to the given colorant is derivable based on the measurement obtained by the measurement device. In an example, the interface 110 comprises a physical connection. The physical connection may be, for example, a Universal Serial Bus (USB) and/or serial data connection to electrically couple a measurement device such as a spectrophotometer and/or colorimeter, wherein data values are transmitted using an appropriate communication protocol over the interface. The interface 110 may comprise a wired or wireless interface. In an example, the interface 110 comprises a user interface. The user interface may, for example, comprise graphical components such as form fields to receive adjustment data, e.g. data output by a separate measurement device. In some examples, the interface 110 is to receive input from an optical measurement device.

The interface 110 may transmit the data indicating the adjustment to the print controller 130. The print controller 130 may store information regarding the adjustment to be applied in the memory 120. In some examples, the print controller 130 is configured to modify an NPac vector based on the indicated adjustment, as described in more detail below. The adjustment may correspond to a target reduction or target increase of an amount of the given colorant in the print output. An example of an adjustment is a correction. The adjustment may comprise a factor to be multiplied to printed colorant quantities such that a target colorant state is attained. In an example, the adjustment is comprised in the data received by the interface 110. In another example, the adjustment is derived by the print controller 130 on the basis of the received data.

The memory 120 comprises a vector 140 in an area coverage space. In an example, the vector 140 comprises an NPac vector. The vector 140 defines a statistical distribution of an operating set of colorant combinations implementable by the printing system over an area of a halftone. The vector 140 may define, for each colorant combination in the operating set of colorant combinations, a likelihood that the colorant combination is to be placed at a given location in an image, e.g. a given output pixel location in a halftone. An output pixel may be a print resolution pixel, i.e. an addressable (printable) area on a print substrate. The vector 140 may have a plurality of components, each component corresponding to a colorant combination in the operating set of colorant combinations. A given component of the vector 140 may have a value representing a probability that a colorant combination corresponding to the given component is to be placed at the given location in the image.

In some examples, the memory 120 comprises a lookup table mapping colorimetric values with vectors in the area coverage space. For example, the lookup table may map RGB or CMYK color values to NPac vectors. In some examples, the lookup table maps XYZ, LAB or any other color space used to specify the device color space. Where the vectors comprise NPac vectors, the lookup table may be referred to as a "HANS lookup table". When an RGB mapping is used, the HANS lookup table may comprise $17^3$ entries. When a CMYK mapping is used, the HANS lookup table may comprise $9^4$ entries. The vector 140 may correspond to an entry in the HANS lookup table.

In examples where the vector 140 is an NPac vector, the operating set of colorant combinations corresponds to an operating set of NPs. The operating set of colorant combinations may correspond to an operating state of the printing system 100 and/or of a printing process implemented by the printing system 100. An operating state may be a configuration of the printing system 100 that influences how the printing process is performed by the printing system 100. In examples, the operating state relates to a constraint of the printing process and/or of the printing system 100 implementing the printing process. For example, different printing systems may have different operating characteristics, relating to the constraints or capabilities of the different printing systems. In some examples, a given printing system may be configurable with different operating states, for example where a given operating state is associated with a given printing process of a plurality of printing processes performable by the printing system. A constraint may relate to the use of NPs over a HANS look-up table. An operating set of NPs may be a predetermined set of NPs over which a color look-up table can define NPac vectors. The operating set of NPs may be determined by a resource generation process, e.g. when building a HANS look-up table.

In some examples, the operating set of colorant combinations is dependent on a colorant drop sequence of the printing process. A colorant drop sequence may define a set of possible drop states of colorants used in the printing process. For example, a first colorant drop sequence may allow for the drop states [0, 1, 2, 4] to be used, where each drop state refers to a number of drops (or volume) of printing fluid to be deposited. This may relate to numbers of drops ejected by a print head and/or a number of passes of a print head. In this colorant drop sequence, a 4-drop state is used but a 3-drop state is not used. A second, different colorant drop sequence may allow for the drop states [0, 1, 2, 3] to be used. In the second colorant drop sequence, a 3-drop state is used but a 4-drop state is not used. Some example printing systems may be configured to transition from one colorant drop sequence to a different colorant drop sequence. Different NPs may be implementable with different colorant drop sequences. For example, NPs using a 4-drop state may not be implementable with a [0, 1, 2, 3] drop sequence.

In some examples, the operating set of colorant combinations is dependent on a number of passes used in the printing process. The printing system 100 may use a multipass printing process. The number of passes may be constrained by the printing system 100. The colorant drop sequence may be dependent on the number of passes, or vice-versa. A change in the colorant drop sequence may be influenced by the number of passes and/or by a change in the number of passes, for example. Different numbers of passes may be associated with different print modes. For example, a first print mode may use eight passes and a second print mode may use four passes.

In some examples, the operating set of colorant combinations is dependent on a total number of colorant combinations that the printing system 100 is configured to handle, for example in a printing pipeline used by the printing system 100. The total number of colorant combinations that the printing system 100 can handle may be considered a constraint or limitation of the printing system 100 and/or of the printing pipeline used by the printing system 100. For example, a memory and/or system bus bandwidth in an embedded control system may use a given number of bits, which may constrain the number of elements in a colorant combination vector (e.g. an 8-bit constraint may limit the number of colorant combinations to 255).

The memory 120 further comprises configuration data 150 dependent on the operating set of colorant combinations. The configuration data 150 maps colorant adjustments to relationships between colorant combinations in the operating set of colorant combinations. The configuration data 150 is usable to modify the vector 140 to implement both increases and decreases in colorant, as described in more detail below.

The print controller 130 is arranged to identify first and second subsets of the operating set of colorant combinations. The first and second subsets are identified using the configuration data 150 and the data indicating the adjustment. The configuration data 150 indicates a relationship between a given colorant combination in the first subset and a corresponding colorant combination in the second subset for an increase in the given colorant and for a decrease in the given colorant.

The print controller 130 is further arranged to modify the vector 140. The print controller 130 is arranged to modify the vector 140 by decreasing a contribution to the vector 140 of a colorant combination in the first subset and increasing a contribution to the vector 140 of a colorant combination in the second subset.

In some examples, the configuration data 150 comprises a matrix of colorant combinations. The matrix may comprise as many rows as there are colorant combinations, e.g. NPs, in the operating set. In some examples, each column of the matrix corresponds to a different colorant or printing fluid useable by the printing system 100. The matrix includes the first and second subsets of colorant combinations. The matrix may be populated according to a predetermined format such that a colorant combination in the second subset may be identified on the basis of the position in the matrix of a corresponding colorant combination in the first subset. As such, the matrix describes relationships between colorant combinations in terms of the different contributions of colorants to those colorant combinations. In an example, the elements in the matrix store the colorant combination that would result if a predetermined amount of a given colorant is subtracted from a given colorant combination. In another example, the elements in the matrix store the colorant combination that would result if a predetermined amount of the given colorant is added to a given colorant combination. An example of a predetermined amount is one drop.

In some examples, the configuration data 150 comprises two matrices of colorant combinations. One of the two matrices corresponds to colorant reductions and the other of the two matrices corresponds to colorant increases. The tables below illustrate corresponding example sections of such matrices for a given operating set of colorant combinations. The two matrices may be consolidated into a single matrix in some examples.

| | Decrease (−) | | | |
|---|---|---|---|---|
| NP/Colorant | C | M | Y | K |
| ... | | | | |
| CMM | MM | CM | N/A | N/A |
| MYK | N/A | YK | N/A | MY |
| ... | | | | |

| | Increase (+) | | | |
|---|---|---|---|---|
| NP/Colorant | C | M | Y | K |
| ... | | | | |
| CMM | CCMM | N/A | CMMY | CMMK |
| MYK | CMYK | MMYK | MYYK | MYKK |
| ... | | | | |

As shown above, if the colorant C is being reduced (first table), the NP resulting from CMM is MM. If the colorant M is being reduced, the NP resulting from CMM is CM, and so on. If the colorant C is being increased (second table), the NP resulting from CMM is CCMM. For the example matrix above, the colorant combination CMMM is not present in the operating set of colorant combinations. CMMM may not be implementable by the printing system 100. For example, the printing system 100 may not be capable of using, or may be configured not to use, more than two drops of a given colorant in any colorant combination, thus excluding CMMM which contains three drops of M. As such, the matrix above does not indicate CMMM as the NP resulting from CMM and an increase in the M colorant, even though CMMM would otherwise be expected.

Similarly, in the example matrix above, the colorant combination MK is not present in the operating set of colorant combinations. Therefore. MK is not indicated as the NP resulting from MYK and a decrease in the Y colorant. As such, the decay and growth matrices may not have fully populated rows in some examples. In other words, the decay and growth matrices may have unfilled elements. Which elements, and how many, are unfilled is based on the operating set of colorant combinations. For example, an operating set comprising a relatively large number of implementable colorant combinations may result in a relatively densely populated decay and/or growth matrix. An operating set comprising relatively few implementable colorant combinations, on the other hand, may result in a relatively sparsely populated decay and/or growth matrix. Thus, the data comprised in the matrices, namely the configuration data, is dependent on the operating set of colorant combinations.

In some examples, the configuration data 150 indicates, for a given colorant combination and a given colorant to be adjusted, the difference between the given colorant combination and the colorant combination that is to result (e.g. be introduced) from the colorant adjustment. For example, the configuration data 150 may indicate the difference as a number of drops of the given colorant, e.g. a one drop difference of M between CMM and CM. In some examples, the configuration data 150 indicates whether a colorant combination is to be skipped or not used, as described in more detail below.

As such, the configuration data 150 may be adapted for use with different operating sets of NPs. The configuration data 150 may be used to apply color calibrations when the operating set of NPs does not contain an unlimited progressive set of NPs, i.e. a set of every possible NP that may potentially be implementable. In a case where the operating set of NPs is unlimited, the decay matrix and the growth matrix may be inverses of each other. Color calibration in this case may be symmetrical, i.e. modifying an initial NPac vector for an increase in colorant and then modifying the NPac vector for a decrease in colorant results in the initial NPac vector again, with an overall effect of no change in colorant. In examples where the operating set of NPs is constrained, e.g. by an operating condition of the printing system, the decay matrix and the growth matrix may not be inverses of each other, and color calibration in these examples may not be symmetrical.

The matrices may be arranged such that colorant combinations having a greater amount of a given colorant are positioned above colorant combinations that have a lesser amount of the given colorant. For example, CMM may be positioned above CM in the matrices. The elements of the matrices may be arranged differently in other examples. The positioning of colorant combinations in the matrices may influence an order in which the area coverages of colorant combinations are adjusted during color calibration of the printing system. The matrix used for decreases in colorant may be referred to as a "decay matrix". The matrix used for increases in colorant may be referred to as a "growth matrix". Each of the matrices may be referred to as an "adjustment matrix". Each matrix maps colorant adjustments (e.g. a decrease or an increase in colorant) to relationships between NPs in the operating set. The adjustment matrices may be used to influence an adjustment sequence of NPs used in color calibrating the printing system 100, as will be explained in more detail below.

Figure 2:
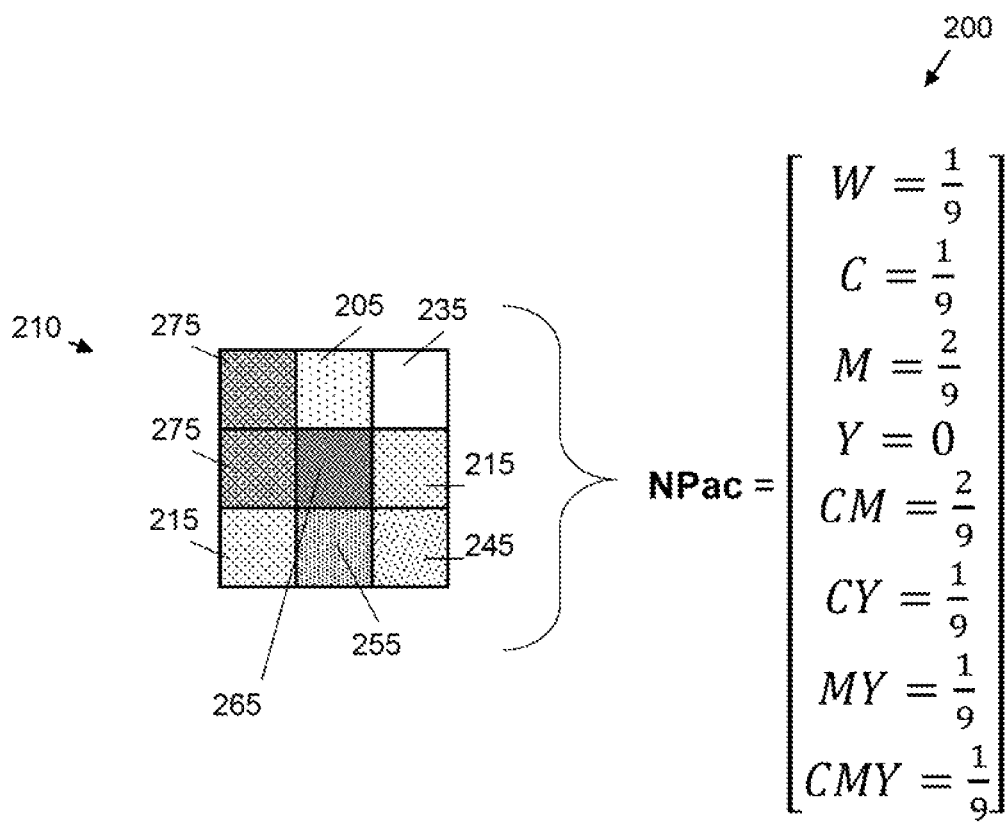
FIG. 2 is a schematic diagram showing a representation of a Neugebauer Primary area coverage vector according to an example.

FIG. 2 shows an example NPac vector 200 for use in a CMY imaging system. The NPac vector 200 may be an adjusted NPac vector resulting from a calibration process performed in accordance with examples described herein. This example shows a three-by-three pixel area 210 of a print output where all pixels have the same NPac vector: vector 200. The NPac vector 200 defines the probability distributions for each NP for each pixel, for example a likelihood that $NP_x$ is to be placed at the pixel location. Hence, in the example print output there is one pixel of White (W) (235); one pixel of Cyan (C) (245); two pixels of Magenta (M) (215); no pixels of Yellow (Y); two pixels of Cyan+Magenta (CM) (275); one pixel of Cyan+Yellow (CY) (255); one pixel of Magenta+Yellow (MY) (205); and one pixel of Cyan+Magenta+Yellow (CMY) (265). Generally, the print output of a given area is generated such that the probability distributions set by the NPac vectors of each pixel are fulfilled. For example, the NPac vector may be effected by a halftone stage that implements the spatial distribution of colorants combinations defined by the vector, e.g. via a series of geometric shapes such as dots of predetermined sizes being arranged at predetermined angles. As such, an NPac vector is representative of the colorant overprint statistics of a given area. Although a CMY system is used for ease of explanation, other imaging systems may be used.

Figure 3:
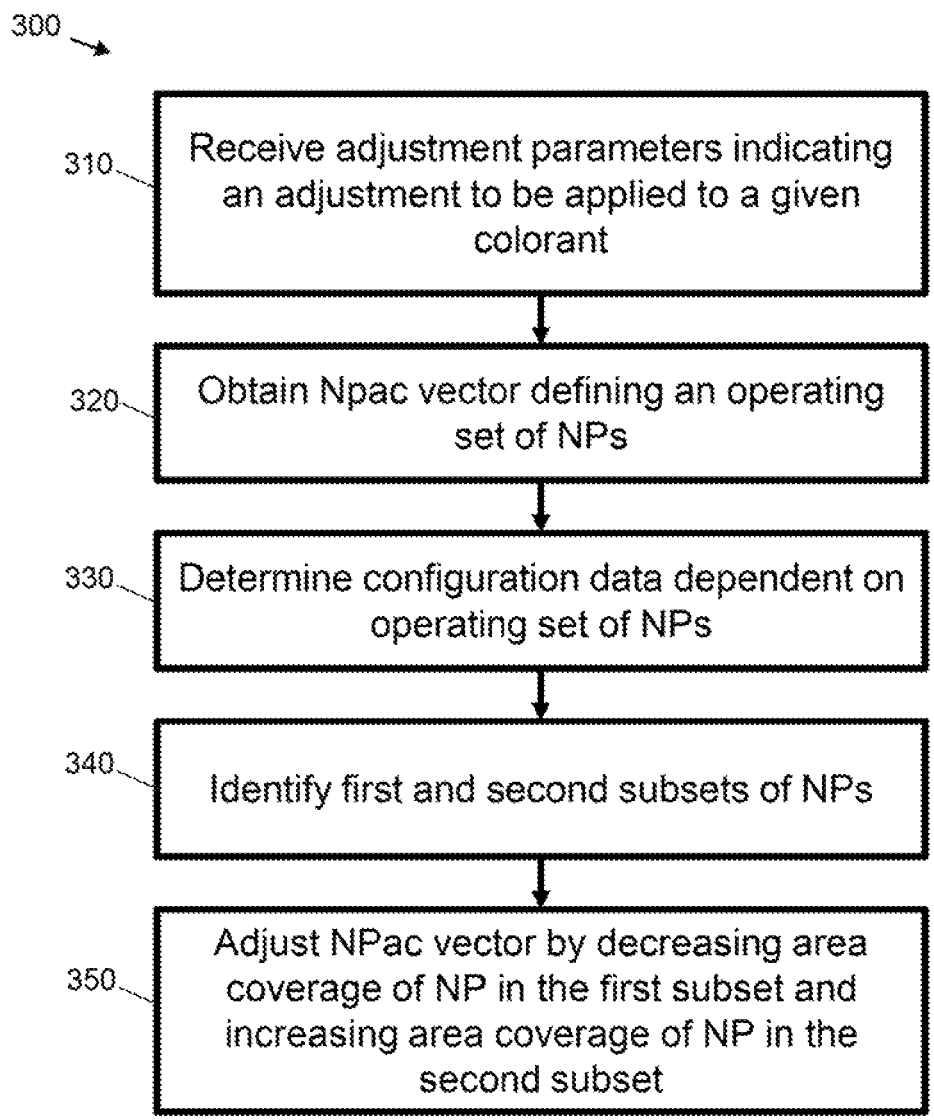
FIG. 3 is a flow chart illustrating a method for calibrating a printing system according to an example.

FIG. 3 shows a method 300 of calibrating a printing system according to an example. In some examples, the method 300 is performed by a print controller such as print controller 140. The print controller may perform the method based on instructions retrieved from a computer-readable storage medium. The printing system may comprise printing system 100.

At item 310, adjustment parameters are received. The adjustment parameters identify a given colorant in a set of colorants printable by the printing system. The adjustment parameters indicate an adjustment to be applied to the given colorant. In some examples, the adjustment parameters are derived based on measurement data. Such measurement data may be received from a measurement device. The measurement device may be comprised in or separate from the printing system. The measurement data may be indicative of an optical property of a printed test patch formed from the given colorant. The measurement data may be based on a comparison of a printed patch corresponding to the given colorant to reference data. In some examples, the measurement data and/or the adjustment parameters are received from a memory. The memory may be comprised in or separate from the printing system.

In some examples, the adjustment parameters relate to multiple colorants in the set of colorants. For example, the adjustment parameters may identify a plurality of colorants and indicate adjustments to be applied to each of the plurality of colorants. Each adjustment may comprise an increase or a decrease in colorant. In an example, the adjustment parameters indicate an increase to be applied to a first colorant in the set of colorants and a decrease to be applied to a second colorant in the set of colorants. The adjustment parameters may comprise a sequence of factors by which each of the set of colorants is to be adjusted in order to maintain a same color as a reference. For example, where the set of colorants comprises CMYK, the adjustment parameters may comprise a calibration factor vector of [0.8, 0.85, 0.8, 1.1], indicating that reductions to 80%, 85% and 80% are to be applied to cyan, magenta and yellow, respectively, and an increase to 110% is to be applied to black. Hence the calibration factor vector indicates a combination of decreases and increases.

At item 320, an NPac vector is obtained. In some examples, the NPac vector is obtained from a HANS lookup table. The NPac vector may be retrieved from a memory of the printing system. The NPac vector defines an operating set of NPs. The operating set of NPs comprises NPs which are impementable by the printing system. The NPac vector comprises area coverages of one or more NPs in the operating set of NPs.

At item 330, configuration data is determined dependent on the operating set of NPs. The configuration data maps colorant adjustments to relationships between NPs in the operating set of NPs. The configuration data indicates a relationship between a given NP in the first subset and a corresponding NP in the second subset for an increase in the given colorant and for a decrease in the given colorant.

At item 340, the configuration data and the adjustment parameters are used to identify first and second subsets of the operating set of NPs.

At item 350, the NPac vector is adjusted. The NPac vector may be adjusted based on the adjustment parameters. Adjusting the NPac vector results in an adjusted NPac vector. The NPac vector is adjusted by decreasing an area coverage in the NPac vector of an NP in the first subset and complementarily increasing an area coverage in the NPac vector of an NP in the second subset. In some examples, the NPac vector is adjusted by decreasing area coverages in the NPac vector of multiple NPs in the first subset and complementarily increasing area coverages in the NPac vector of multiple NPs in the second subset. A complementary increase in area coverage refers to an increase in area coverage applied to an NP that at least partly balances a corresponding decrease in area coverage applied to another NP. In other words, the increase in area coverage applied to the first NP is dependent on the decrease in area coverage applied to the second NP.

In some examples, the NP in the first subset and the NP in the second subset correspond to colorant combinations that differ by a predetermined amount of the given colorant. The predetermined amount may be dependent on an operating state of the printing system. For examples, the predetermined amount may be dependent on which NPs are in the operating set of NPs implementable by the printing system, where the operating set of NPs is dependent on the operating state of the printing system.

In an example, the predetermined amount comprises a minimum printable amount of the given colorant. For example, the predetermined amount may comprise one drop of the given colorant. In some examples, the predetermined amount comprises more than one drop of the given colorant. In some examples, the predetermined amount comprises a fraction of a drop of the given colorant.

In some examples, the NP in the first subset corresponds to a colorant combination comprising a first amount of the given colorant, and the NP in the second subset corresponds to a colorant combination comprising a second, different amount of the given colorant. In some examples, one of the first amount and the second amount is zero.

In some examples, the colorant combinations corresponding to the NP in the first subset and the NP in the second subset each comprise a same amount of a further colorant in the set of colorants. In some examples, the colorant combinations corresponding to the NP in the first subset and the NP in the second subset comprise the same amounts of every colorant except for the given colorant. As such, the colorant combinations corresponding to the NP in the first subset and the NP in the second subset may be the same except for the predetermined amount of the given colorant.

In an example, the colorant combination corresponding to the NP in the second subset comprises less of the given colorant than the colorant combination corresponding to the NP in the first subset. This may be the case where the adjustment to be applied to the given colorant is a decrease in the given colorant, for example. In another example, the colorant combination corresponding to the NP in the second subset comprises more of the given colorant than the colorant combination corresponding to the NP in the first subset. This may be the case where the adjustment to be applied to the given colorant is an increase in the given colorant, for example.

In an example, an initial area coverage in the NPac vector of the NP in the second subset is zero. As such, the NP in the second subset may be introduced to the NPac vector as part of the adjusting process. In other words, an NP having an initial area coverage in the NPac vector of zero may be given a non-zero area coverage in the adjusted NPac vector.

In some examples, adjusting the NPac vector comprises decreasing the area coverage in the NPac vector of the NP in the first subset and increasing the area coverage in the NPac vector of the NP in the second subset by a same amount. As such, adjusting the NPac vector may comprise distributing the initial area coverage in the NPac vector of the NP in the first subset between the NP in the first subset and the NP in the second subset.

In some examples, the configuration data is generated in response to a change in the operating set of NPs implementable by the printing system. Generating the configuration data may comprise updating or adjusting existing configuration data, for example configuration data corresponding to a previous operating set of NPs. The operating set of NPs may change based on a change in the operating state of the printing system. For example, a colorant drop sequence and/or a number of printing passes used by the printing system may change. In an example a total number of NPs that the printing system is able to handle may change. As such, the configuration data may be kept up-to-date to reflect a current operating set of NPs implementable by the printing system.

In one example, an initial un-adjusted NPac vector may comprise NPs having the following area coverages: W: 0.2, CM: 0.4, CMM: 0.4. As the NPac vector comprises a convex combination of NPs, the area coverages of the NPs in the NPac vector sum to 1. In this example, the adjustment parameters indicate that an adjustment is to be applied to the colorant magenta (M). The adjustment parameters indicate that the adjustment to be applied is a reduction. The adjustment parameters identify that a colorant reduction target for magenta (M) is −25%. The colorant reduction target may be in the form of a correction factor derived based on a measured optical property of a printed patch formed of the M colorant. The number of drops of the M colorant in the initial NPac vector is 0.4*1 (CM)+0.4*2 (CMM)=1.2. The drop reduction target is therefore 1.2*0.25=0.3. In this example, the first subset of NPs includes CMM, since it comprises the greatest number of drops of M of the NPs present in the initial NPac vector. In order to meet the drop reduction target of 0.3, 0.3 of the area coverage of CMM is transferred to an NP having one drop less of M, namely CM. CM is in the second subset of NPs in this case. CM is identified by the configuration data, e.g. a decay matrix. Since CM is already present in the NPac vector, the transferred area coverage is added to the initial area coverage of CM. As such, the area coverage of CMM is decreased and the area coverage of CM is increased. The resulting NPac vector has the following area coverages: W: 0.2, CM: 0.7, CMM: 0.1. The number of drops of the M colorant in the adjusted NPac vector is 0.7*1 (CM)+0.1*2 (CMM)=0.9 (25% less than the initial number of drops of M, namely 1.2). Therefore, the colorant reduction target is met.

In an example where CM is not in the operating set of NPs implementable by the printing system, the configuration data may indicate that CM is not to be used and/or is not implementable. In this case, the configuration data may indicate that an NP other than CM is to be used. The configuration data may indicate that an NP and/or an NP level is to be skipped. For example, instead of increasing the area coverage in the NPac vector of CM, the area coverage of C may be increased. That is, the area coverage of CMM may be split between CMM and C, rather than between CMM and CM, in a case where CM is not in the operating set of NPs. In some examples, the configuration data indicates, for a given NP and a given colorant to be adjusted, the difference between the given NP and the NP that is to be introduced. For example, where CM is in the operating set of NPs, the configuration data may indicate "one drop" as the difference between the initial NP CMM, and the NP whose area coverage is to be increased, namely CM. Where CM is not in the operating set of NPs, the configuration data may instead indicate "two drops" in the element corresponding to the row "CMM" and the column "M", indicating that C, which has a difference of two drops of M compared to CMM, is to be used.

In another example, the adjustment parameters indicate that the colorant adjustment to be applied to the example un-adjusted NPac vector above is an increase. The adjustment parameters identify that a colorant increase target for magenta (M) is +25%. The drop increase target is therefore 1.2*0.25=0.3. In order to meet the drop increase target of 0.3, 0.3 of the area coverage of CMM is transferred to an NP having one drop more of M namely CMMM. CMMM is in the second subset of NPs in this case. CMMM is identified by the configuration data, e.g. a growth matrix. Since CMMM has an initial area coverage in the NPac vector of zero, the transferred area coverage from CMM effectively results in CMMM being introduced into the NPac vector. As such, the area coverage of CMM is decreased and the area coverage of CMMM is increased from zero. The resulting NPac vector has the following area coverage: W: 0.2, CM: 0.4, CMM: 0.1, CMMM: 0.3. The number of drops of the M colorant in the adjusted NPac vector is 0.4*1 (CM)+0.1*2 (CMM)+0.3*3 (CMMM)=1.5 (25% more than the initial number of drops of M, namely 1.2). Therefore, the colorant increase target is met.

In examples where CMMM is not in the operating set of NPs, for example where a maximum of two drops of colorant are useable in each NP, the configuration data may indicate that CMMM is not to be used and/or is not implementable. In this case, the configuration data may indicate that an NP level is to be skipped. For example, instead of decreasing the area coverage in the NPac vector of CMM and increasing the area coverage of CMMM, the area coverage in the NPac vector of CM may instead be decreased and the area coverage of CMM correspondingly increased in order to meet the colorant increase target. In such a case, the resulting NPac vector has the following area coverage: W: 0.2, CM: 0.1, CMM: 0.7. The number of drops of the M colorant in this NPac vector is 0.1*1 (CM)+0.7*2 (CMM)=1.5, thereby meeting the colorant increase target.

In some examples, adjusting the NPac vector comprises decreasing an area coverage in the NPac vector of a further NP in the first subset and complementarily increasing an area coverage in the NPac vector of a further NP in the second subset. Colorant combinations corresponding to the NP in the first subset and the further NP in the first subset each comprise a same amount of the given colorant.

The further NP in the first subset and the further NP in the second subset may correspond to colorant combinations that differ by a predetermined amount of the given colorant. In an example, the colorant combinations corresponding to the NP in the first subset and the NP in the second subset differ by a first amount of the given colorant, and the colorant combinations corresponding to the further NP in the first subset and the further NP in the second subset differ by a second amount of the given colorant. In an example, the second amount is different from the first amount. In another example, the second amount is the same as the first amount.

The colorant combinations corresponding to the NP in the first subset and the further NP in the first subset may each comprise a same amount of the given colorant. For example, where the given colorant is M, the NP and further NP in the first subset may comprise CMM and YMM respectively. As such, the NP and the further NP in the subset may be grouped together based on the two NPs having the same amount of the given colorant. Similarly, the colorant combinations corresponding to the NP in the second subset and the further NP in the second subset may each comprise a same amount of the given colorant. For example, where the given colorant is M, the NP and further NP in the second subset may comprise CM and YM respectively.

In some examples, the area coverage in the NPac vector of the further NP in the first subset is decreased by a same amount as the area coverage in the NPac vector of the further NP in the second subset is increased. As such, adjusting the NPac vector may comprise distributing the initial area coverage in the NPac vector of the NP in the first subset between that NP and the NP in the second subset (for example between CMM and CM), and distributing the initial area coverage in the NPac vector of the further NP in the first subset between that NP and the further NP in the second subset (for example between YMM and YM).

In some examples, adjusting the NPac vector comprises decreasing the area coverage of the NP in the first subset using a first weighting and decreasing the area coverage of the further NP in the first subset using a second weighting. The first and second weightings may be based on an area coverage reduction to be applied to the subset of NPs as a whole. The first and second weightings may be based on an initial area coverage in the NPac vector of the NP and the further NP in the first subset, respectively. As such, existing color relationships may be maintained during the calibration process.

In some examples, an amount of the given colorant in the adjusted NPac vector is determined. The amount of the given colorant in the adjusted NPac vector may be compared with the adjustment indicated by the received adjustment parameters. In response to determining that the amount of the given colorant in the adjusted NPac vector has a predetermined relationship with the adjustment indicated by the received adjustment parameters, the NPac vector may be further adjusted. In an example, the predetermined relationship comprises the amount of the given colorant in the adjusted NPac vector not being equal to a target amount. The target amount may be derived based on the adjustment indicated by the received adjustment parameters. In some examples, for example where the adjustment to be applied to the given colorant is a decrease, the predetermined relationship comprises the amount of the given colorant in the adjusted NPac vector being greater than the target amount. In other examples, for example where the adjustment to be applied to the given colorant is an increase, the predetermined relationship comprises the amount of the given colorant in the adjusted NPac vector being less than the target amount.

In response to determining that the amount of the given colorant in the adjusted NPac vector has the predetermined relationship with the adjustment indicated by the received adjustment parameters, the configuration data may be used to identify a third subset of the operating set of NPs. The adjusted NPac vector is then further adjusted using the third subset. Further adjusting the adjusted NPac vector comprises decreasing the area coverage in the adjusted NPac vector of the NP in the second subset and complementarily increasing an area coverage in the adjusted NPac vector of an NP in the third subset. The configuration data indicates relationships between NPs in the second subset and corresponding NPs in the third subset.

The NP in the second subset and the NP in the third subset may correspond to colorant combinations that differ by a further predetermined amount of the given colorant. The further predetermined amount may be the same as or different from the predetermined amount corresponding to the difference between the NP in the first subset and the NP in the second subset. In some examples, the colorant combination corresponding to the NP in the first subset comprises a first amount of the given colorant, the colorant combination corresponding to the NP in the second subset comprises a second amount of the given colorant, and the colorant combination corresponding to the NP in the third subset comprises a third amount of the given colorant. For example, the colorant combinations corresponding to the NPs in the first, second and third subsets may comprise three drops, two drops and one drop of the given colorant, respectively. In one example, where the given colorant is M, the colorant combinations corresponding to the NPs in the first, second and third subsets are CMM, CM and C, respectively.

The method 300 may be repeated for other colorants in the set of colorants, and/or for other NPac vectors.

The adjusted NPac vector may be stored in a lookup table mapping colorimetric values with NPac vectors, e.g. a HANS lookup table. The color mapping represented by the HANS lookup table may be applied to print job data, for example in a printing operation performed by the printing system.

In a case of an adjustment comprising a decrease in the use of a particular colorant (e.g. M), the first subset of NPs that are identified at block 340 may comprise NPs identified using the "decay" matrix as described above, e.g. NPs from the first column of the example table above. In this case, the second subset of NPs may comprise NPs as identified by entries relating to the first subset of NPs, e.g. entries in the column "M" in the "decay" matrix. In a case of an adjustment comprising an increase in the use of a particular colorant (e.g. M), the first and second subsets may be inverted as compared to the decrease case, e.g. the second subset of NPs to increase may be identified using the first column of the example "growth" matrix above, and the first subset of NPs to decrease may be indicated by the entries in the column "M" of the "growth" matrix. In this case, the configuration data comprises both the "decay" and "growth" matrices but one matrix is selected depending on the adjustment.

In more complex cases, an adjustment may comprise a sequence of increases and decreases of more than one colorant. The first subset of NPs may then comprise those NPs that have a net decrease in area coverage values following the sequence of operations and the second subset of NPs may comprise those NPs that have a net increase in area coverage values following the sequence of operations. During the sequence of operations, area coverage values for a given NP may be both increased and decreased, e.g. an adjustment to increase C but decrease M may result in both an increase and a decrease to the NP of CM. Whether the sequence of operations result in a net decrease or a net increase, e.g. whether CM belongs to the first subset or the second subset of NPs may depend on a size of adjustment to C and M, and the values within the configuration data.

In certain cases, blocks 340 and 350 may be implemented iteratively. For example, the operations of these blocks may be applied at a lower level on a colorant-by-colorant basis, which at the end of the sequence results in a net increase and/or net decrease to identified NPs. For example, the adjustment parameters received at block 310 may indicate a decrease from 100% to 80% M and an increase from 100% C to 120% C (e.g. change factors of 0.8 and 1.2). The adjustment may be made by first applying operations similar to blocks 340 and 350 for an increase operation for C, where a change is propagated to identified set of NPs (e.g. those that use C), then applying operations similar to blocks 340 and 350 for a decrease operation for M, where a change is propagated to another identified set of NPs (e.g. those that use M). The identified sets of NPs may overlap, e.g. CM may be in an identified set of NPs for both an increase operation and a decrease operation. An order of a sequence of operations by be defined based on a supplied or defined order of colorants to be adjusted, e.g. as part of the adjustment parameters of block 310. The operations themselves may then use one matrix or one of individual increase and decrease matrices. The net result of the sequence of operations may be an identification of a first subset of NPs to decrease, and a second subset of NPs to increase, e.g. as in block 340, and changes in area coverage values, e.g. as in block 350.

Figure 4:
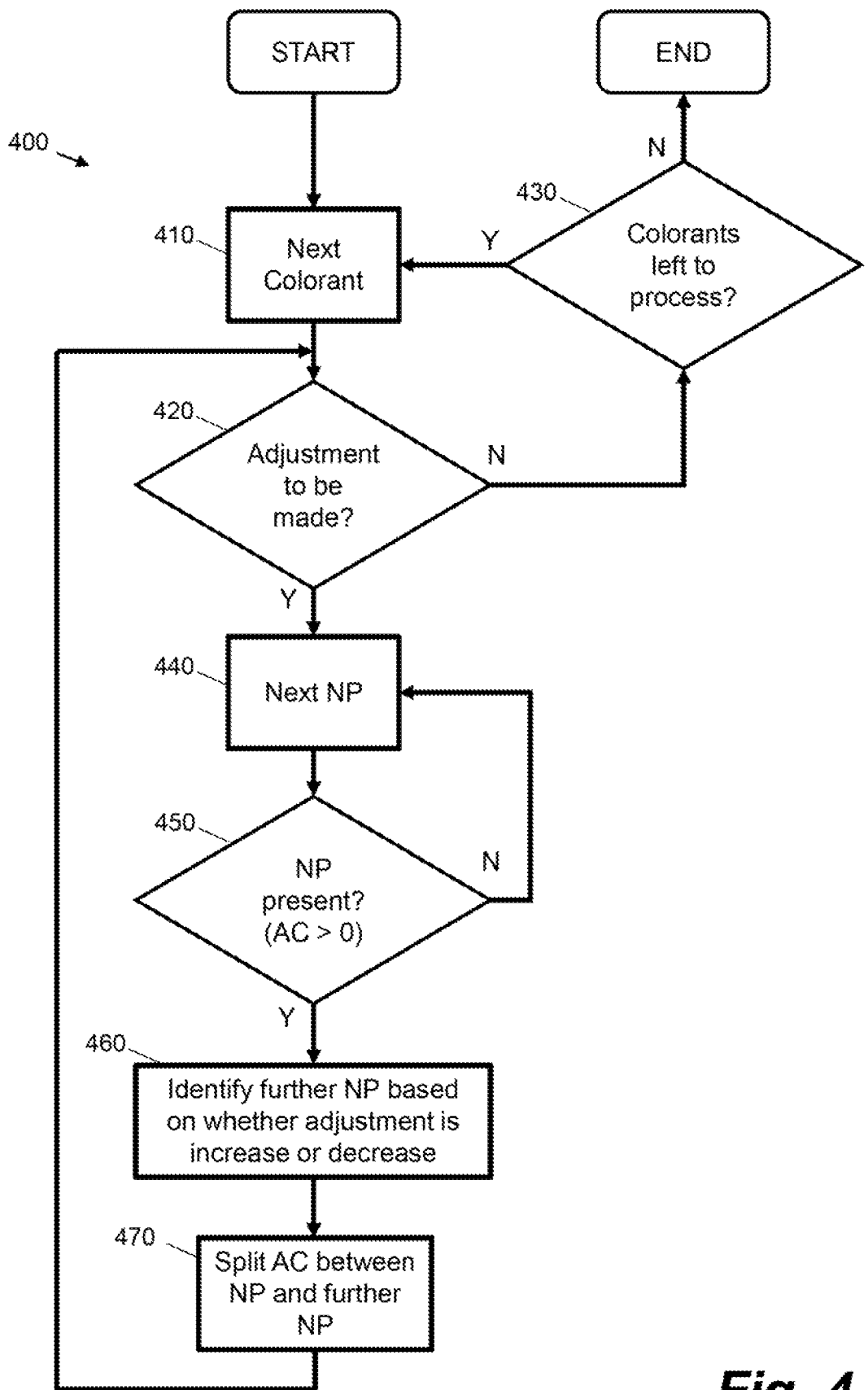
FIG. 4 is a flow chart illustrating a method for calibrating a printing system according to an example.

FIG. 4 shows a method 400 of calibrating a printing system according to an example. In some examples, the method 400 is performed by a print controller such as print controller 140. The print controller may perform the method based on instructions retrieved from a computer-readable storage medium. The printing system may comprise the printing system 100 shown in FIG. 1. The method 400 is performed for a given NPac vector. In some examples, the method 400 is performed for a plurality of NPac vectors in a HANS lookup table useable by the printing system. In some examples, the method 400 is performed for every NPac vector in a HANS lookup table useable by the printing system.

The method 400 may be considered to represent a nested loop through configuration data mapping colorant adjustments with relationships between NPs, which traverses different NPs for each colorant in the printing system.

At item 410, a given colorant is selected from a set of colorants in the printing system.

At item 420, it is determined whether the amount of the given colorant in the NPac vector is to be adjusted. For example, the amount of the given colorant may be increased or decreased as part of the adjustment. Such a determination may be based on received data indicating an adjustment or correction to be applied to the given colorant, and on an initial amount of the given colorant in the NPac vector.

If it is determined at item 420 that the amount of the given colorant in the NPac vector is not to be adjusted, it is determined at item 430 whether there are any colorants left to process for the NPac vector. If there are colorants left to process for the NPac vector, the next colorant is selected at item 410, and the process is repeated.

If it is determined at item 420 that the amount of the given colorant in the NPac vector is to be adjusted, an NP is selected at item 440 from a set of available NPs. The set of available NPs comprises the NPs that may be formed from combinations of the colorants in the printing system. The selected NP may comprise an NP in the set of available NPs that has the highest possible number of drops of the given colorant.

At item 450, it is determined whether the selected NP is present in the NPac vector that is to be adjusted. The selected NP is present in the NPac vector if the selected NP has a non-zero area coverage in the NPac vector. If it is determined that the selected NP is not present in the NPac vector, another NP is selected at item 440, and the process is repeated. The other NP may comprise fewer drops of the given colorant compared to the initially selected NP.

If it is determined at item 450 that the selected NP is present in the NPac vector, a further NP is identified at item 460 on the basis of whether the colorant adjustment comprises an increase or a decrease of the given colorant. The further NP is identified using configuration data mapping colorant adjustments with relationships between NPs. Identifying the further NP may comprise selecting between a first and a second adjustment matrix, where the first adjustment matrix maps colorant decreases to relationships between NPs (i.e. a "decay matrix") and the second adjustment matrix maps colorant increases to relationships between NPs (i.e. a "growth matrix"). Both the first and the second adjustment matrices are part of the configuration data. Each adjustment matrix may indicate a different NP as the further NP. The NP identified as the further NP by the decay matrix may comprise less of the given colorant, e.g. fewer drops, than the selected NP. The NP identified as the further NP by the growth matrix may comprise more of the given colorant, e.g. more drops, than the selected NP.

At item 470, the area coverage of the selected NP is split between the selected NP and the further NP. The further NP differs from the selected NP by a predetermined amount of the given colorant, e.g. a drop of the given colorant. The further NP may correspond to a higher or a lower drop state of the given colorant than the selected NP, dependent on whether the colorant adjustment is an increase or a decrease, respectively.

If the initial area coverage in the NPac vector of the selected NP is greater than the adjustment target for the given colorant, the area coverage that is to be transferred from the selected NP to the further NP in order to satisfy the colorant adjustment target is determined. Transferring the determined area coverage from the selected NP to the further NP satisfies the colorant adjustment target, therefore completing the calibration process for the given colorant.

If the initial area coverage in the NPac vector of the selected NP is less than the adjustment target for the given colorant, the entire area coverage in the NPac vector of the selected NP is transferred to the further NP. The transferred area coverage is subtracted from the colorant adjustment target to determine an amount of the given colorant that is still to be adjusted. The process is then repeated, e.g. splitting the area coverage of the further NP between the further NP and another NP, and so on, until the colorant adjustment target is met.

The above process may be repeated for different colorants in the set of colorants, and/or repeated for different NPac vectors in a HANS look-up table of the printing system.

Figure 5:
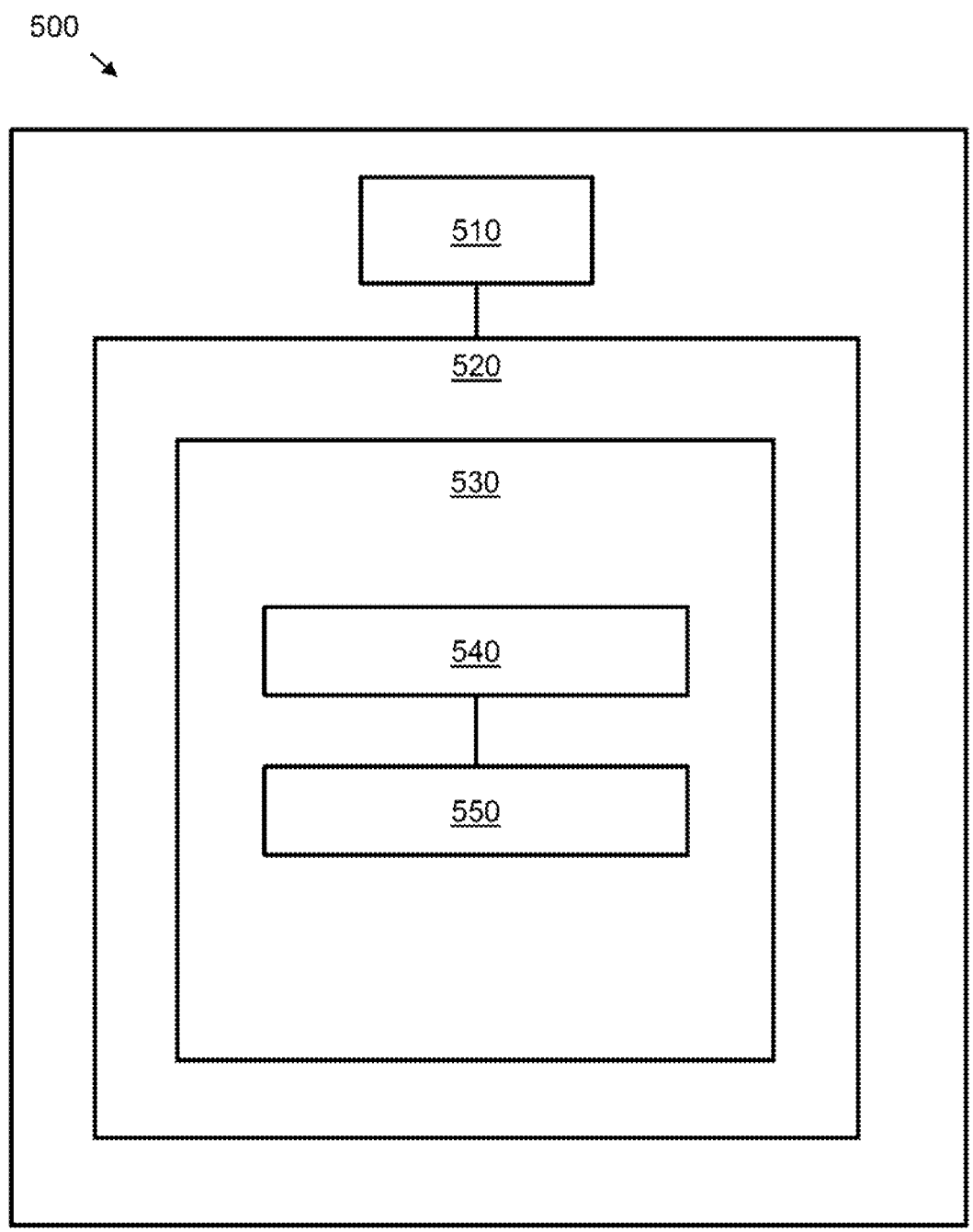
FIG. 5 is a schematic diagram of a processor and a computer readable storage medium with instructions stored thereon according to an example.

FIG. 5 shows example components of a printing system 500, which may be arranged to implement certain examples described herein. A processor 510 of the printing system 500 is connectably coupled to a computer-readable storage medium 520 comprising a set of computer-readable instructions 530 stored thereon, which may be executed by the processor 510. The printing system 500 may comprise a printing system similar to printing system 100.

Instruction 540 instructs the processor 510 to receive adjustment parameters identifying a given printing fluid in a set of printing fluids useable by the printing system 500. The adjustment parameters indicate an adjustment to be applied to the given printing fluid. The adjustment parameters may be based on measured optical data received, for example, from an optical measuring device comprised in or communicatively coupled to the printing system 500. The measured optical data indicates a measured optical property of a printed test area. The printed test area is formed from the given printing.

Instruction 550 instructs the processor 510 to calibrate the printing system 500 by modifying an NPac vector. Modifying the NPac vector comprises determining configuration data dependent on an operating set of NPs implementable by the printing system 500. The configuration data maps printing fluid adjustments to relationships between NPs in the operating set of NPs. Modifying the NPac vector further comprises using the configuration data and the adjustment parameters to identify first and second subsets of the operating set of NPs. Modifying the NPac vector further comprises decreasing an area coverage in the NPac vector of an NP in the first subset and complementarily increasing an area coverage in the NPac vector of an NP in the second subset. The configuration data indicates a relationship between a given NP in the first subset and a corresponding NP in the second subset for an increase in the given printing fluid and for a decrease in the given printing fluid. The modified NPac vector may be used in a printing operation involving the printing system 500.

Processor 510 can include a microprocessor, microcontroller, processor module or subsystem, programmable integrated circuit, programmable gate array, or another control or computing device. The computer-readable storage medium 520 can be implemented as one or multiple computer-readable storage media. The computer-readable storage medium 520 includes different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. The computer-readable instructions 530 can be stored on one computer-readable storage medium, or alternatively, can be stored on multiple computer-readable storage media. The computer-readable storage medium 520 or media can be located either in the printing system 500 or located at a remote site from which computer-readable instructions can be downloaded over a network for execution by the processor 510.

Certain examples described herein enable a reduction in the number of test patches to be printed and measured for a given printer calibration. Test patches are printed and measured for individual colorants rather than for NPs or colorant combinations. The number of colorants in a printing system may be less than the number of colorant combinations useable by the printing system. A relatively small number of test patches may therefore be printed and measured compared to a case in which NPs or colorant combinations are individually printed, measured and adjusted. By reducing the number of test patches to be printed and measured, the calibration process may be made more efficient. For example, the time to calibrate a given printer may be reduced. Additionally, or alternatively, by reducing the number of test patches to be printed and measured, fewer resources may be used, such as printing fluid or substrate, thereby reducing wastage and/or cost.

Certain examples described herein enable a colorant correction to be evenly distributed across different but related NPs in an NPac vector. Distributing the correction across NPs enables relationships between colors to be maintained during the calibration process and reduces deviation from the initial NPac structure. This results in an increased visual quality of the calibrated output compared to a case in which a correction is not distributed across related NPs. In certain examples, components of an initial NPac vector change progressively, e.g. fewer new NPs or no new NPs for relatively small colorant adjustments, and gradually more new NPs for more significant colorant adjustments, thereby maintaining existing color relationships and increasing visual quality.

Certain examples described herein enable an amount of printing fluid in an NPac vector to be reduced without increasing an amount of whitespace. Such a printing fluid reduction may be distributed amongst related NPs by "decaying" NPs in the NPac vector. This is in contrast to increasing a contribution of whitespace to the NPac vector to compensate for a reduced contribution of a given NP. By reducing a contribution of whitespace to the NPac vector, graininess in the printed output may be reduced, thereby increasing a visual quality of the printed output.

Certain examples described herein enable flexibility in calibrating a printer to be increased. NPac vectors may be modified for both increases and decreases in colorant amounts and for a variety of operating sets of NPs, including constrained operating sets of NPs. Color calibration may not be dependent on a predetermined ceiling or upper limit to which colorant levels may be increased in some examples.

Certain examples described herein enables a resource generation process, e.g. building color look-up tables, to be simplified. NPac vector adjustment for both increases and decreases in colorant may be implemented using a single HANS look-up table. Further HANS look-up tables, e.g. containing adjusted NPac vectors, corresponding to different colorant adjustments, may be derived from a single initial HANS look-up table. Such look-up tables may be built according to user preferences, for example dependent on the operating set of NPs that are being used for a given printing system and/or printing process. This may use fewer computational resources and/or take less time than computing new HANS look-up tables from scratch.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of calibrating a printing system, comprising:
   receiving adjustment parameters identifying a given colorant in a set of colorants printable by the printing system, the adjustment parameters indicating an adjustment to be applied to the given colorant;
   obtaining a Neugebauer Primary area coverage (NPac) vector defining an operating set of Neugebauer Primaries (NPs) implementable by the printing system;
   determining configuration data dependent on the operating set of NPs, the configuration data mapping colorant adjustments to relationships between NPs in the operating set of NPs;
   using the configuration data and the adjustment parameters to identify first and second subsets of the operating set of NPs; and
   adjusting the NPac vector by decreasing an area coverage in the NPac vector of an NP in the first subset and complementarily increasing an area coverage in the NPac vector of an NP in the second subset,
   wherein the configuration data indicates a relationship between a given NP in the first subset and a corresponding NP in the second subset for an increase in the given colorant and for a decrease in the given colorant.

2. The method of claim 1, wherein the NP in the first subset and the NP in the second subset correspond to colorant combinations that differ by a predetermined amount of the given colorant, the predetermined amount being dependent on an operating state of the printing system.

3. The method of claim 2, wherein the colorant combinations corresponding to the NP in the first subset and the NP in the second subset each comprise a same amount of a further colorant in the set of colorants.

4. The method of claim 1, wherein the received adjustment parameters indicate an increase to be applied to a first colorant in the set of colorants and a decrease to be applied to a second colorant in the set of colorants.

5. The method of claim 1, wherein an initial area coverage in the NPac vector of the NP in the second subset is zero.

6. The method of claim 1, comprising:
   in response to determining that an amount of the given colorant in the adjusted NPac vector has a predetermined relationship with the adjustment indicated by the received adjustment parameters:
   using the configuration data to identify a third subset of the operating set of NPs; and
   further adjusting the adjusted NPac vector by decreasing the area coverage in the adjusted NPac vector of the NP in the second subset and complementarily increasing an area coverage in the adjusted NPac vector of an NP in the third subset.

7. The method of claim 1,
   wherein the adjusting the NPac vector comprises decreasing an area coverage in the NPac vector of a further NP in the first subset and complementarily increasing an area coverage in the NPac vector of a further NP in the second subset, and
   wherein colorant combinations corresponding to the NP in the first subset and the further NP in the first subset each comprise a same amount of the given colorant.

8. The method of claim 7,
   wherein colorant combinations corresponding to the NP in the first subset and the NP in the second subset differ by a first amount of the given colorant, and
   wherein colorant combinations corresponding to the further NP in the first subset and the further NP in the second subset differ by a second amount of the given colorant, different from the first amount.

9. The method of claim 7, comprising decreasing the area coverage of the NP in the first subset using a first weighting and decreasing the area coverage of the further NP in the first subset using a second weighting, the first and the second weightings being based on an initial area coverage in the NPac vector of the NP in the first subset and the further NP in the first subset, respectively.

10. The method of claim 1, comprising using the adjusted NPac vector in a printing operation performed by the printing system.

11. The method of claim 1, comprising generating the configuration data in response to a change in the operating set of NPs implementable by the printing system.

12. A printing system comprising:
   an interface to receive data indicating an adjustment to be applied to a given colorant in a set of colorants printable by the printing system;
   a memory comprising:
   a vector in an area coverage space, the vector defining a statistical distribution of an operating set of colorant combinations implementable by the printing system over an area of a halftone; and
   configuration data dependent on the operating set of colorant combinations, the configuration data mapping colorant adjustments to relationships between colorant combinations in the operating set of colorant combinations; and
   a print controller to:
   identify first and second subsets of the operating set of colorant combinations using the configuration data and the data indicating the adjustment; and
   modify the vector by decreasing a contribution to the vector of a colorant combination in the first subset and complementarily increasing a contribution to the vector of a colorant combination in the second subset,
   wherein the configuration data indicates a relationship between a given colorant combination in the first subset and a corresponding colorant combination in the second subset for an increase in the given colorant and for a decrease in the given colorant.

13. The printing system of claim 12, comprising:
a printing device to print a calibration area onto a print substrate, the calibration area corresponding to the given colorant; and
a measurement device to obtain a measurement of an optical property of the calibration area,
wherein the data indicating the adjustment to be applied to the given colorant is derivable based on the measurement obtained by the measurement device.

14. The printing system of claim 12, wherein the colorant combination in the first subset and the colorant combination in the second subset differ by a predetermined amount of the given colorant, the predetermined amount being dependent on an operating state of the printing system.

15. A non-transitory computer-readable storage medium comprising a set of computer-readable instructions that, when executed by a processor of a printing system, cause the processor to:
receive adjustment parameters identifying a given printing fluid in a set of printing fluids useable by the printing system, the adjustment parameters indicating an adjustment to be applied to the given printing fluid; and
calibrate the printing system by modifying a Neugebauer Primary area coverage (NPac) vector,
wherein the instructions that cause the processor to calibrate the printing cause the processor to:
determine configuration data dependent on an operating set of NPs implementable by the printing system, the configuration data mapping printing fluid adjustments to relationships between NPs in the operating set of NPs;
use the configuration data and the adjustment parameters to identify first and second subsets of the operating set of NPs; and
decrease an area coverage in the Npac vector of an NP in the first subset and complementarily increase an area coverage in the Npac vector of an NP in the second subset,
wherein the configuration data indicates a relationship between a given NP in the first subset and a corresponding NP in the second subset for an increase in the given printing fluid and for a decrease in the given printing fluid.

* * * * *